J. B. BEAUVAIS.
WATER HEATING APPARATUS.
APPLICATION FILED MAR. 1, 1913.

1,098,082.

Patented May 26, 1914.

5 SHEETS—SHEET 1.

WITNESSES:
H. L. Sprague
W. P. Noble.

INVENTOR,
John B. Beauvais,
BY
ATTORNEY.

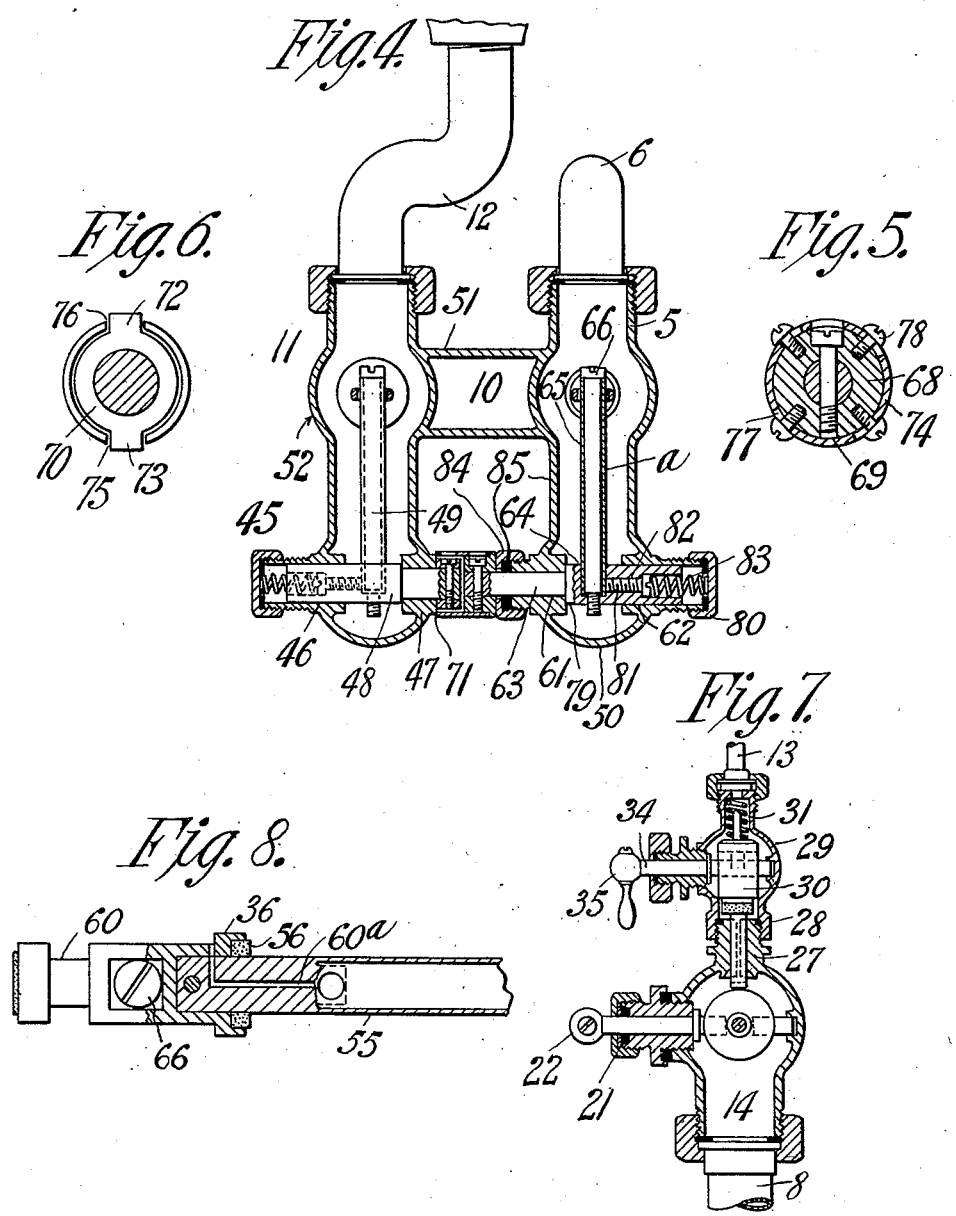

J. B. BEAUVAIS.
WATER HEATING APPARATUS.
APPLICATION FILED MAR. 1, 1913.
1,098,082.
Patented May 26, 1914.
5 SHEETS—SHEET 3.
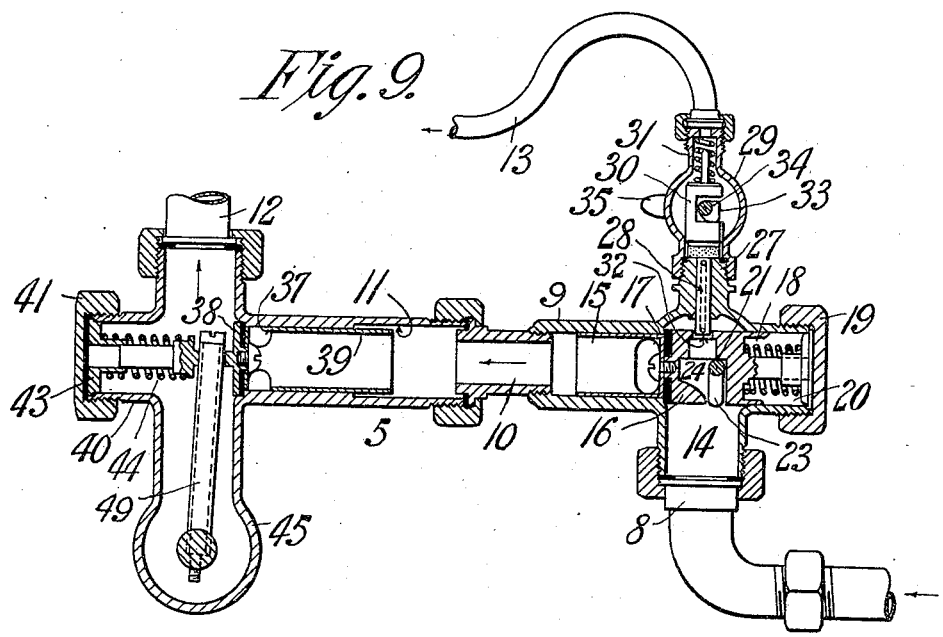
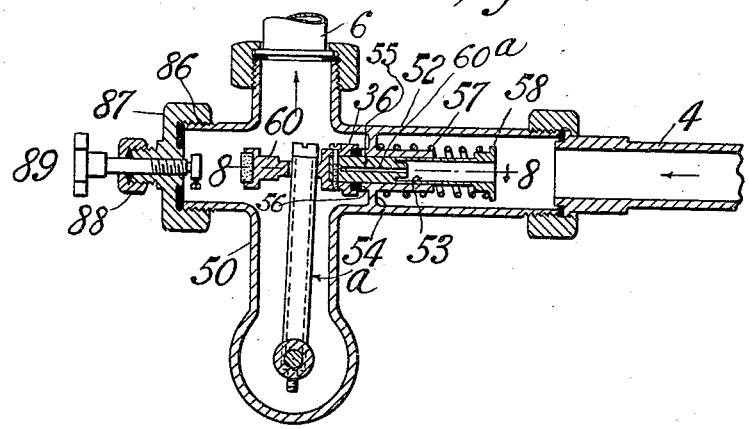
WITNESSES:
H. L. Sprague
W. P. Noble
INVENTOR,
John B. Beauvais,
BY
ATTORNEY.

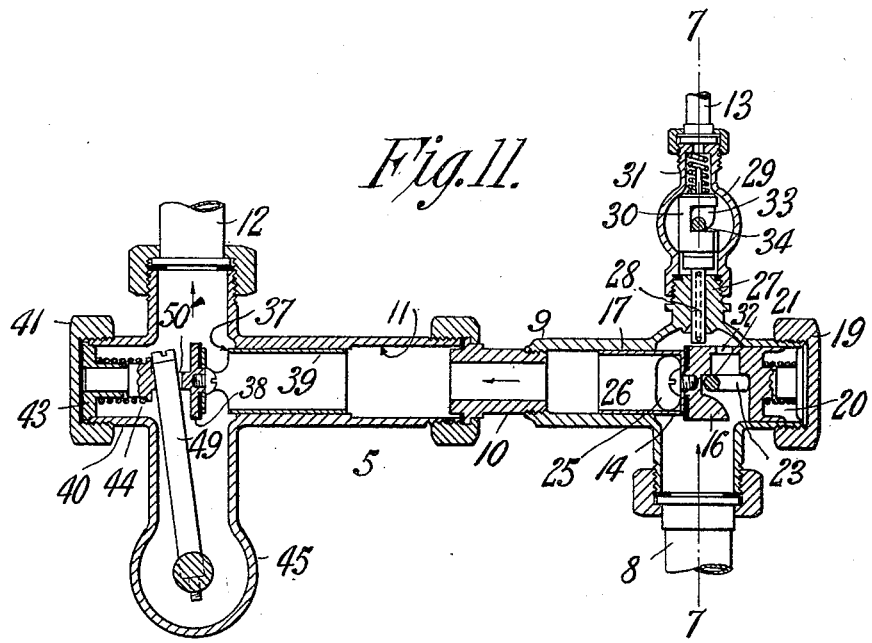
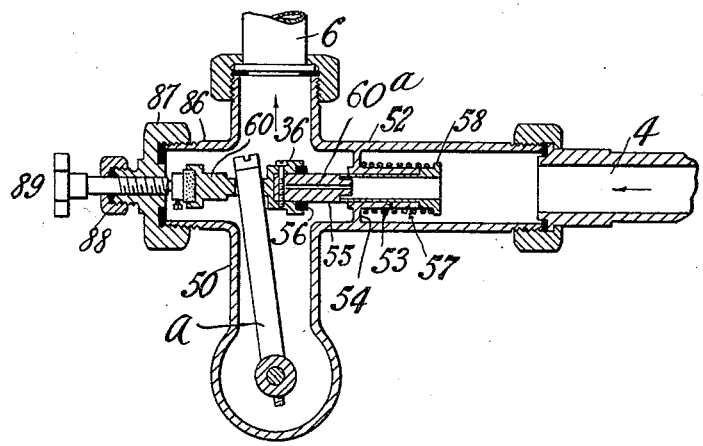

UNITED STATES PATENT OFFICE.

JOHN B. BEAUVAIS, OF HOLYOKE, MASSACHUSETTS, ASSIGNOR TO THE BEAUVAIS WATER HEATER COMPANY, OF SPRINGFIELD, MASSACHUSETTS, A CORPORATION OF MASSACHUSETTS.

WATER-HEATING APPARATUS.

1,098,082.  Specification of Letters Patent.  Patented May 26, 1914.

Application filed March 1, 1913. Serial No. 751,489.

*To all whom it may concern:*

Be it known that I, JOHN B. BEAUVAIS, a citizen of the United States of America, and resident of Holyoke, in the county of Hampden and State of Massachusetts, have invented certain new and useful Improvements in Water-Heating Apparatuses, of which the following is a full, clear, and exact description.

This invention relates to apparatus for providing hot water in the normal water supply, wherein the water can be heated as it flows, and in which the heating medium is gas, such as ordinary illuminating gas.

One of the objects of the invention is to provide a safety device whereby the pilot burner customary in this form of apparatus, must first have its valve opened before the valve supplying the gas to the apparatus can be opened; and, furthermore, whereby the gas valve for the pilot burner may not be closed until after the main gas burner shall have been shut off.

Another object of the invention is to provide an improved form of connection between the main water valve and the main gas valve which work in unison, causing at any cessation in the flow of water, the gas valve to close and prevent the further heating of the water.

A further object is to provide in connection with said latter valves, means for adjusting their operative connection which is accessible outside of the chambered members in which they are contained.

Another object of the invention is to provide an improved form of construction of the valve actuated by the water pressure to furnish improved efficiency in operation and to facilitate the assemblage of the parts; and to further provide means for adjusting the amount of movement or flow of the valve which is located inside of the casing.

Another object is to provide an improved form of the described water actuated valve wherein the movement of the plunger, by unequal water pressure, does not affect in any way the flow of the water; and which arrangement has means operable from the exterior of the casing for adjustment to control passages through which the water flows, to thereby vary its passage.

Figure 1:
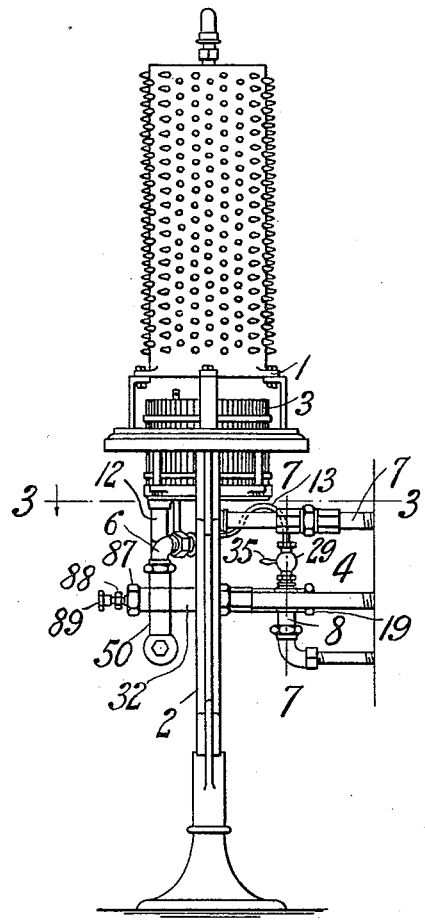
Figure 2:
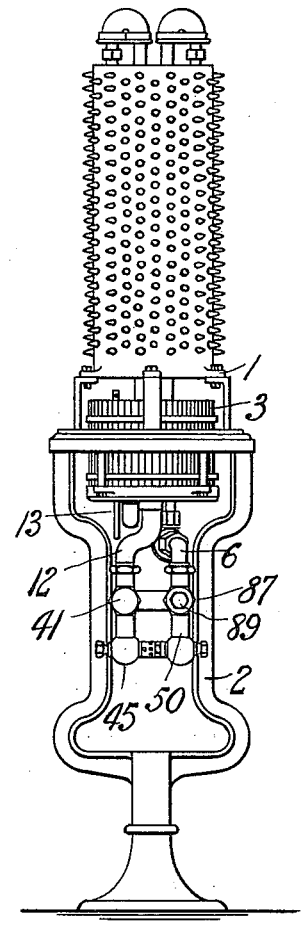
Figure 3:
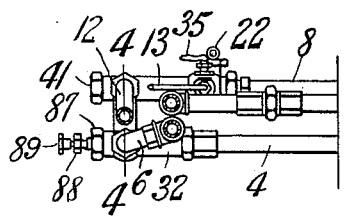
Figure 13:
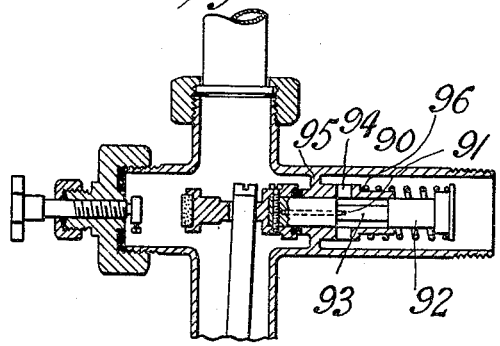
Figure 14:
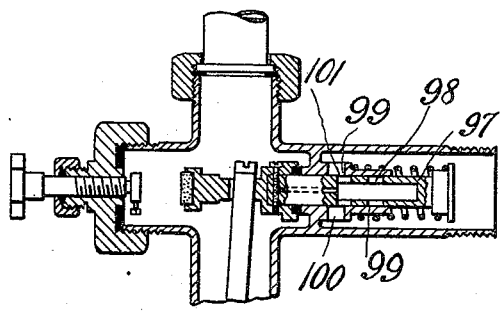
Figure 15:
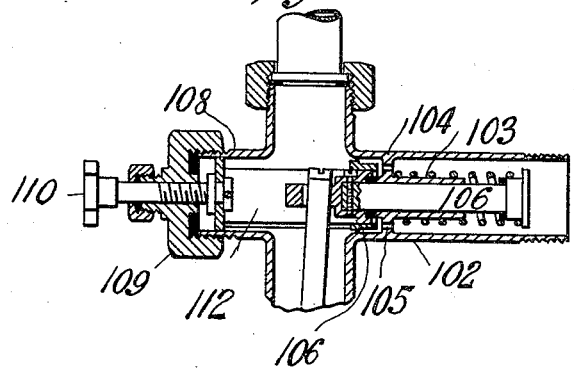

In the accompanying drawings, showing embodiments of my invention: Figure 1 is a side elevation; Fig. 2 is a view at right angles to Fig. 1; Fig. 3 is a view of the valve arrangement as taken on the line 3—3, Fig. 1. Fig. 4 is a vertical section on the line 4—4, of Fig. 3, with the parts enlarged. Fig. 5 is a vertical section through outer end of shaft 63; Fig. 6 is a vertical section through outer end of shaft 48; Fig. 7 is a vertical section enlarged, as seen on the line 7—7, Fig. 1; Fig. 8 shows, enlarged, a detail of the valve member taken on the line 8—8 of Fig. 10. Fig. 9 is a vertical section taken through the gas controlling valve and its inlet controlling member showing also the pilot controlling valve. Fig. 10 is a vertical section through one form of the water controlled valve. Fig. 11 is a view similar to Fig. 9 with the valves in the open position. Fig. 12 is a view similar to Fig. 10 with the valve in open position. Figs. 13 and 14 show slight modifications of the valve shown in Fig. 12. Fig. 15 shows another form of the water controlled valve.

In Figs. 1 and 2 is shown a heating member 1 mounted on a suitable stand denoted generally by 2 with a burner device 3 which may be of any suitable or desired form, and constitutes no part of the present invention.

The water supply is shown as entering through a pipe 4 connected to a double casing member denoted generally by 5. The water passes from the same through connection 6 to the heating member 1, and leaves the same by suitable outlet 7 from which it passes to the desired place of supply.

The gas for supplying the heating medium is shown as entering by pipe 8 leading to a double valve member 9. This member is joined by a connection 10 with the chambered portion 11 of the member 5. The gas is led from the latter through a pipe 12 to the burner portion 3 of the heater. A reduced pipe 13 connects from the said gas controlled member 9 to a suitable pilot light in the burner which is arranged in the usual manner to provide ignition for the main gas burner when the latter is opened.

Referring now to Figs. 9 and 11, the gas controlling member 9 is shown provided with an inlet portion 14 and an outlet portion 15 which is controlled by a valve 16 arranged to engage a seat portion 17. The valve 16 slides in a suitable bore in the casing and is pressed against its seat by a spring 18, which engages a removable threaded cap 19 which screws on the open end 20 of the casing. By removing this cap the valve and its spring can be readily removed and assembled when desired. For operating this valve, a stem 21 projects through an opening in the casing and is turned by a suitable handle 22.

Inside of the casing the stem has a bent portion 23 forming a crank arm located in a recess 24 in the body of the valve. When this stem is swung from the position shown in Fig. 9 to that indicated in Fig. 11, the valve will be moved back from its seat and compress its spring. This will permit the flow of the gas through a suitable opening 25 in the sleeve extension 26 of the valve, which opening is, of course, closed when the valve is seated and the supply of gas cut off.

The casing 9 is shown provided with an extension 27 in the bore of which slides a body 28 which is shown as chambered or provided with a passage which provides an outlet for the gas in the member 9. On the extension 27 is mounted a valve casing 29 in which slides a valve 30 which is normally engaged by a coil spring 31 to press the valve downward on a seat including the said passage containing the body, and which body is secured to the valve 30 to be carried thereby. When this valve is in its closed position, the body 28 projects into a recess 32 in the valve 16, the latter valve being in the closed position. This will effectually prevent movement of the valve 16 away from its seat by its actuating stem, and, therefore, this main gas valve cannot be opened until the auxiliary valve 30 has been shifted.

The auxiliary valve 30 is operated by a cam 33 mounted on a stem 34 projecting through the casing 31 and carrying a handle 35. By swinging the handle, this auxiliary valve is raised, permitting the gas to flow through the connection 13 to the pilot light and at the same time the body is advanced, releasing the valve 16, permitting it to be turned by its stem 21. This will insure the pilot light being turned on first, therefore igniting before the main gas supply can be admitted to the burner.

The passage through the body 28 finds exit at one side of the body whereby it will be closed when the valve 30 is seated, but exposed when this valve has been opened.

From the gas controlling member 9, the gas passes to the said casing portion 11, in which a cylindrical portion 36 contains a valve seat 37 controlled by a valve 38 suitably guided by a cylindrical extension 39. At the opposite portion of this casing is an extension 40 closed by a threaded cap 41, and a plunger 42 carried by the valve 38 slides in a suitable collar 43 carried by the cap, and controlled by a coil spring 44 which serves to return the valve 38 and retain it seated. By removing this cap 41 the spring plunger and the valve are accessible and may be easily removed. This casing 11 has a downwardly projecting extension 45 having opposite alining openings 46 and 47 in which swings a rockshaft 48. This shaft has an arm 49 connecting with the said valve member 37 by projecting through an apertured portion 50' of the valve stem. By this means the rocking of the shaft will serve to open and close the gas valve 37, the said casing 5 which is rigidly connected with the casing 11 by a cross frame 51, having a valve portion 52 shown as substantially parallel with the said valve casing 36, the casing 52 connecting with the water inlet 4. In this casing is mounted a cylinder 53 which is carried by an annular wall 54. The valve 55 slides in this cylinder and carries a seat 56 which engages the inner end of the cylinder in the normal position of the valve, and against which it is pressed by a coil spring 57 which is compressed between the said wall 54 and the head 58 on the plunger 55.

The valve is shown as closed in Fig. 10, and in the open position in Fig. 12, in which latter it will be seen that the water can pass freely through the tubular rear end of the valve and around passages 59 therein, such passages being covered by the cylinder in the closed position of the valve; but a restricted passage 60$^a$ is provided through the valve whereby a small amount of water is permitted to pass in order to permit the valve to seat when the water is prevented from flowing through the heater. This valve 53 has an apertured extension 60 through which projects an arm $a$. This arm is carried by an extension of the shaft 48. The casing 50 has openings 61 and 62 in which swings a shaft section 63 which alines with the said shaft 48 and is rigidly connected therewith. This shaft 63 has a transverse bore 64 having one end reduced and threaded, constituting a shoulder. The arm $a$ is shown in the form of a bolt having its lower end reduced and screwing into the said opening 64. Around this bolt is a sleeve 65 also projecting into the opening and engaging its seat, the sleeve being engaged by the head 66 of the bolt whereby its arm is secured to the shaft.

The shaft sections being secured together, the valve 55 actuated by the differences of pressure of the water on opposite sides of the wall 54 when the water is admitted into the heater, will swing the rockshaft through the arm which will cause the gas valve 37 to be opened and admit the gas to the burner. But as soon as the water is shut off from the heater, the water valve will be closed by its spring which through the rockshaft and arms thereon will cause the gas valve to be closed, the latter being at this time opened by its water pressure.

As stated, the shaft sections 48 and 63 are in alinement, and they are shown as adjustably secured together at their exposed portions between the sections of the casing.

Referring particularly to Figs. 4, 5 and 6, the shaft section 63 has a collar 68 secured thereon by a screw 69 passing through both of said members and countersunk into the collar. A collar 70 is secured on the shaft section 48 by a screw 71, which collar is provided with lugs 72 and 73. A sleeve 74 is shown surrounding said two collars which are of equal diameter; and this sleeve has slots 75 and 76 into which project the lugs 72 and 73 whereby the sleeve is secured to turn with the shaft section 48. This sleeve 74 is shown as provided with four slots 77 arranged in a circular series, through which pass adjusting screws 78 which extend into suitably threaded holes in the collar 68.

The slots 77 are elongated circumferentially so that relative movement rotatively may be had between the sleeve 74 and the collar 68 limited by the movement of the screws in the slots. By this means the two shaft sections can be rotatively adjusted to be locked by these screws 78 in the adjusted position. And it will be seen that these four screws 78 are accessible from the outside of the casing.

The shaft section 63 is shown as reduced at its inner bearing portion where it projects through the casing to be connected to the other shaft section, the opening being correspondingly smaller than the opposite opening in the casing, and thereby a shoulder 79 is provided on the shaft. The opening 62 in the casing is shown as closed by a threaded cap 80. The shaft section 63 is shown provided with a threaded bore 81 in which is placed a screw 82 for clamping the sleeve 65 and the bolt 66 in position, and preventing their working loose. And a coil spring 83 is placed between the cap 80 and the shaft or the screw in the shaft whereby this shaft section is caused to tightly engage at the shoulder 79 and prevent leakage. As a further precaution, a cap 84 is placed around the shaft section 63 at the opposite portion of the casing to confine a packing 85 around the shaft section at this portion. The other shaft section 48 is provided with the same form of confining screw and spring and cap to cause a tight joint; and the arm 49 connecting the shaft section 48 with the gas valve is shown as constructed and arranged in the same manner as that for the water valve just described.

In order to adjustably limit the opening movement of the water valve 55, the casing 50 is shown as provided with an extension 86 whose open end is closed by the cap 87 having a threaded bore 88, and in the latter turns a threaded stem 89 projecting into the casing in position to engage the valve extension 60 when the valve is in its open position as indicated in Fig. 12. By turning this stem 89 the amount of opening of the valve can be regulated as desired.

In Fig. 13 another form of water valve is shown in which the casing 90 has an inner cylinder 91 in which slides a stem 92 which is not provided with a bore as is the described stem 55, but merely has a reduced neck portion 93 arranged to register with openings 94 in the cylinder. When this valve is moved to open position, this neck portion connects the opening 94 with the casing beyond the connecting wall 95. This stem is provided with a restricted passage 96 for permitting the normal flow of the water through the valve member. Otherwise, this valve arrangement is similar to that described.

In Fig. 14 another modification of the valve actuated by the fluid pressure is shown in which the plunger 97 is chambered as in Fig. 12, but with the inlet end closed, and is provided with openings 98 which are normally closed by the cylinder 99 in the casing, but register with openings 100 in the cylinder in the open position of the plunger and valve. Other openings 101 in the plunger permit passage of the water into the casing in the open position. Otherwise, this form of valve is similar to that shown in Fig. 12.

Another form of water controlled valve is shown in Fig. 15 in which the casing 102 is provided with a cylinder 103 supported by an annular wall 104 in which are provided a number of holes 105 for the passage of the water through this wall. In this arrangement, the piston 106 is solid and provided with no passages, the water flowing entirely through the said openings in the wall, and the plunger being advanced by the unequal water pressure on the opposite sides of the wall when the pressure in the heater is reduced or removed, permitting free flow of the water. In this modification, means are provided for controlling or restricting the flow of the water at the openings in the wall 104, a sleeve 106 being slidable around the valve portion 107 of the plunger to have its end brought in more or less close proximity to the said openings in the wall.

The open end 108 of the casing is threaded to engage the cap 109 in whose threaded bore turns a threaded stem 110, and the sleeve 106 is secured to the inner end of the stem whereby it can be moved to and from the said apertured wall. This sleeve has suitable openings to allow free movement of the arm 112 which is locked by engagement with the valve. By this means, the flow of the water can be regulated from the outside of the casing and during the operation of the apparatus.

I claim:—

1. In a gas water heating apparatus, a casing provided with a pair of chambers, a valve member operating in each of said chambers, a rock-shaft supported to swing in the casing and extending into both said chambers, an arm on the shaft in each of said chambers, connected with said valves for causing simultaneous movements of the valves, said shaft being jointed intermediate of said arms and provided with means for adjustment at such joint that is located outside of the casing for operation without removing the shaft from the casing.

2. In a gas water heating apparatus, a casing provided with a pair of chambers, a valve member operating in each of said chambers, a rockshaft supported to swing in the casing and extending into both said chambers, an arm on the shaft in each of said chambers, connected with said valves for causing simultaneous movements of the valves, said shaft being jointed intermediate of said arms and provided with means for adjustment at such joint, the casing being provided with openings at one end of the rockshaft for insertion and removal of the shaft, and a spring adjustment for the shaft at the said latter portion.

3. In a gas water heating apparatus, the combination of a casing having a pair of chambers therein, a valve operating in each chamber, a shaft mounted to swing in the casing and extending into both chambers, arms on the shaft, one connecting with each of said valves to move them in unison, said shaft being broken between the two chambers, a sleeve extending over said ends of the shaft connected with the shafts for providing the limited relative movement of the shafts, and means for locking the sleeve when adjusted.

4. In a gas water heating apparatus, the combination of a casing having a pair of chambers therein, a valve operating in each chamber, a shaft mounted to swing in the casing and extending into both chambers, arms on the shaft, one connecting with each of said valves to move them in unison, said shaft being broken between the two chambers, a sleeve extending over said ends of the shaft connected with the shafts for providing the limited relative movement of the shafts, and means for locking the sleeve when adjusted, said sleeve connection being located outside of the casing for permitting said adjustment without removal of the shaft sections.

5. In a gas water heating apparatus, a casing having an inlet and an outlet, a valve in the casing closing the passage between the same, an auxiliary outlet for the casing connected with said inlet, a valve in the latter outlet, a handle on the latter valve, and a locking member on the latter valve that when the two valves are closed will engage the first mentioned valve to prevent its being opened, and that when the outlet valve is turned to open position the locking member is withdrawn, to thereby permit the other valve to be opened.

6. In a gas water heating apparatus, a casing having an inlet and an outlet, a valve controlling the passage between the same, an auxiliary outlet for the casing connected with the said inlet, a valve controlling the outlet, and a connection between said two valves whereby the main valve is locked in closed position by the other valve when closed and the main valve is released by the opening movement of the auxiliary valve, said locking member constituting a valve closing the passage leading to the auxiliary valve when the latter valve is closed.

7. In a gas water heating apparatus, a casing having an inlet and an outlet, a slidable valve controlling the passage between such parts, a stem projecting out of the casing and connected with said valve to control the valve, the valve having a recess therein, the casing having an extension provided with a port, a chambered body slidable in said port to open and close the port in its different positions, said body in one position being arranged to engage recesses in the said valve to lock the valve in closed position, the extension having a valve seat around said port, a valve in the extension arranged to engage said valve seat and to also engage said body in the closed position to hold it to lock the main valve closed, and a stem projecting out of the extension arranged to engage and operate the valve therein.

8. The combination of a casing, a shaft mounted to rock in the casing, a valve seat in the casing, a valve in the casing movable to and from said seat, the shaft having a transverse opening reduced at one end to provide a shoulder with the reduced portion screwed thereat, a stem having a threaded end which is screwed into said opening, the stem being of less diameter than the opening, a sleeve on the stem projecting into the said opening to engage its shoulder, a stem having a head on its outer end engaging said sleeve to lock the same to the shaft, the valve having a neck portion engaging the stem and sleeve to cause the rockshaft and the valve to move in unison.

9. The combination of a casing, a shaft mounted to rock in the casing, a valve seat in the casing, a valve in the casing movable to and from said seat, the shaft having a transverse opening reduced at one end to provide a shoulder with the reduced portion screwed thereat, a stem having a threaded end which screws into said opening, the stem being of less diameter than the opening, a sleeve on the stem projecting into the said opening to engage its shoulder, a stem having a head on its outer end engaging said sleeve to lock the same to the shaft, the valve having a neck portion engaging the stem and sleeve to cause the rockshaft and the valve to move in unison, said shaft having an axial threaded bore at one end leading to said opening, and a screw operating in said bore to engage the said sleeve and stem therein to lock them in position.

10. The combination of a casing, a shaft mounted to rock in the casing, a valve seat in the casing, a valve in the casing movable to and from said seat, the shaft having a transverse opening reduced at one end to provide a shoulder with the reduced portion screwed thereat, a stem having a threaded end which screws into said opening, the stem being of less diameter than the opening, a sleeve on the stem projecting into the said opening to engage its shoulder, a stem having a head on its outer end engaging said sleeve to lock the same to the shaft, the valve having a neck portion engaging the stem and sleeve to cause the rockshaft and the valve to move in unison, said shaft having an axial threaded bore at one end leading to said opening, and a screw operating in said bore to engage the said sleeve and stem therein to lock them in position, the casing having an opening opposite the said locking screw, a removable cap arranged to close said opening, and a spring arranged between the cap and the screw.

11. In a gas water heater, a casing, a cylinder located in the casing, an annular wall connecting the cylinder with the casing, a plunger slidable in the cylinder to be advanced by unequal fluid pressure in the casing on opposite sides of said wall, a spring for retracting the plunger when advanced, a constricted passage in the plunger for permitting the fluid to pass therethrough, and a stop member in the casing having a portion projecting out of the casing for shifting the stop to adjust the limit of movement of the plunger.

12. In a gas water heater, a casing, a cylinder located in the casing, an annular wall connecting the cylinder with the casing, a plunger slidable in the cylinder to be advanced by unequal fluid pressure in the casing on opposite sides of said wall, a spring for retracting the plunger when advanced, a constricted passage in the plunger for permitting the fluid to pass therethrough, and a shaft mounted to swing in the casing and projecting to its interior, and an arm on the shaft connected to said plunger.

13. In a gas water heater, a casing, a cylinder located in the casing, an annular wall connecting the cylinder with the casing, a plunger slidable in the cylinder to be advanced by unequal fluid pressure in the casing on opposite sides of said wall, a spring for retracting the plunger when advanced, a constricted passage in the plunger for permitting the fluid to pass therethrough, a cylinder having one or more openings therein, and a plunger having comparatively large openings therein and arranged to register with such openings when the plunger has been advanced by the fluid pressure to provide free passage for the fluid.

14. The combination of a casing, a cylinder in the casing, an annular wall connecting the casing with the cylinder and provided with openings therethrough, a plunger slidable in the casing to be moved in one direction by unequal fluid pressure on opposite sides of said annular wall, a spring for retracting the plunger, a rockshaft projecting into the casing, an arm on the rockshaft connected with said plunger to oscillate the shaft from reciprocation of the plunger, a slide in the cylinder having its end adjacent the openings in said wall, an outlet for the casing having a threaded bore, and a threaded stem in said bore connected with said slide to adjust the position of the slide from the outside of the casing.

15. The combination of a casing, a cylinder located inside of the casing, an annular wall connecting the cylinder with the casing and provided with openings, a plunger slidable in the cylinder, a spring connecting the plunger with the casing for moving it in one direction, the plunger being operated by unequal fluid pressure on opposite sides of said wall, a valve member controlled by said plunger, and a member slidable in the casing and provided with an extension projecting out of the casing whereby the member can be shifted, said member being thereby moved adjacent the openings in said wall to regulate the passage of the fluid therethrough.

16. The combination of a casing, a plunger mounted to reciprocate in the casing, a spring for moving the plunger in one direction, the plunger being moved in the opposite direction by fluid pressure in the casing, a rockshaft projecting into the casing, an arm fast on the rockshaft and engaging the plunger for oscillating the shaft from the movements of the plunger, the casing having a threaded outlet alining with the plunger, a threaded stem in said outlet adjustable from outside of the casing and arranged to engage the plunger when advanced by the fluid pressure to limit its movement.

17. The combination of a casing, a rockshaft projecting into the casing, an arm carried by the rockshaft in the casing, the casing having a pair of oppositely projecting extensions alining with said arm, one of said extensions having an inlet connected therewith and provided with a valve seat, a valve slidable in said extension and engaging said seat to control the inlet, said valve being connected with said arm whereby the movement of the shaft will open and close the valve, said other extension having a removable cap, and a spring plunger on the inner wall of said cap arranged to engage said arm to move it to close said valve.

18. The combination of a casing having a pair of substantially parallel offset chambered portions, a valve member in each chambered portion, a valve seat in each portion controlled by said valve, said chambered portions having transverse openings which aline to form a bearing, a rockshaft mounted in said openings and projecting through a portion of each casing, the rockshaft being exposed between the casings, an arm on the rockshaft in each of said casings connecting with said valve therein whereby the valves will rock in unison, said rockshaft being in section at the exposed portion between the said chambers, and means adjustably connecting the rockshaft sections permitting adjustment outside of the casing to vary the relative position of the two valves.

19. The combination of a casing having a pair of substantially parallel offset chambered portions, a valve member in each chambered portion, a valve seat in each portion controlled by said valve, said chambered portions having transverse openings which aline to form a bearing, a rockshaft mounted in said openings and projecting through a portion of each casing, the rockshaft being exposed between the casings, an arm on the rockshaft in each of said casings connecting with said valve therein whereby the valves will rock in unison, the rockshaft being in section at the exposed portion, a sleeve mounted on the adjacent ends of the rockshaft between the chambers, said sleeve being secured to one of the shaft sections and provided with a circular series of slots, and screws projecting through said slots of the sleeve and into the shaft section whereby the relative position of the shaft sections can be adjusted outside of the casing.

Signed by me at Springfield, Mass., in presence of two subscribing witnesses.

JOHN B. BEAUVAIS.

Witnesses:
  G. R. DRISCOLL,
  WM. S. BELLOWS.

---

Copies of this patent may be obtained for five cents each, by addressing the "Commissioner of Patents, Washington, D. C."